United States Patent
Park et al.

(10) Patent No.: US 9,705,569 B2
(45) Date of Patent: Jul. 11, 2017

(54) WIRELESS POWER TRANSMITTER AND METHOD FOR CONTROLLING THE SAME

(71) Applicant: SAMSUNG ELECTRO-MECHANICS CO., LTD., Suwon-si (KR)

(72) Inventors: Seung Won Park, Suwon-si (KR); Sang Ho Cho, Suwon-si (KR); Eun Young Shin, Suwon-si (KR); Young Hyok Ji, Suwon-si (KR); Jae Suk Sung, Suwon-si (KR); Chang Ik Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/079,688

(22) Filed: Mar. 24, 2016

(65) Prior Publication Data
US 2016/0352390 A1    Dec. 1, 2016

(30) Foreign Application Priority Data

May 26, 2015  (KR) .......................... 10-2015-0073218
Sep. 23, 2015  (KR) .......................... 10-2015-0134709

(51) Int. Cl.
| | | |
|---|---|---|
| H02J 7/00 | (2006.01) | |
| H04B 5/00 | (2006.01) | |
| H02J 50/12 | (2016.01) | |
| H02J 50/80 | (2016.01) | |
| H02J 7/02 | (2016.01) | |
| H04B 7/06 | (2006.01) | |

(52) U.S. Cl.
CPC ............ *H04B 5/0037* (2013.01); *H02J 50/12* (2016.02); *H02J 50/80* (2016.02); *H02J 7/025* (2013.01); *H04B 7/0617* (2013.01)

(58) Field of Classification Search
CPC .. H02J 17/00; H02J 50/00; H02J 50/15; H02J 50/20; H02J 50/23; H02J 50/12; H04B 5/0037; H04B 7/0617
USPC .................................. 455/567, 573; 320/108
See application file for complete search history.

(56) References Cited

U.S. PATENT DOCUMENTS

2009/0284369 A1*  11/2009  Toncich ............... G06K 7/0008
                                                    340/539.3
2012/0223589 A1*   9/2012  Low ..................... H04B 5/0037
                                                    307/104
(Continued)

FOREIGN PATENT DOCUMENTS

JP             5543433 B2    5/2014
KR    10-2013-0087708 A      8/2013
(Continued)

OTHER PUBLICATIONS

Korean Office Action issued on Nov. 10, 2016 in counterpart Korean Patent Application No. 10-2015-0134709 (14 pages, with English translation).

*Primary Examiner* — Duc M Nguyen
(74) *Attorney, Agent, or Firm* — NSIP Law (57) ABSTRACT

A method of controlling a wireless power transmitter includes actuating the wireless power transmitter to transmit a beacon signal, determining approach of an external object according to a detected change in the beacon signal, and transmitting ping signals having different frequencies responsive to the determined approach of the external object.

21 Claims, 9 Drawing Sheets

(56) References Cited

U.S. PATENT DOCUMENTS

| | | | |
|---|---|---|---|
| 2013/0307468 A1* | 11/2013 | Lee | H02J 7/0052 320/108 |
| 2014/0094116 A1* | 4/2014 | Walley | H02J 7/025 455/41.1 |
| 2014/0306654 A1* | 10/2014 | Partovi | H02J 7/025 320/108 |
| 2015/0097438 A1* | 4/2015 | Aioanei | H02J 7/025 307/104 |
| 2015/0137748 A1 | 5/2015 | Kim et al. | |
| 2015/0333530 A1* | 11/2015 | Moyer | H02J 7/025 307/104 |
| 2015/0357861 A1* | 12/2015 | Muurinen | H02J 7/025 307/104 |
| 2016/0190818 A1* | 6/2016 | He | H02J 5/005 307/104 |

FOREIGN PATENT DOCUMENTS

| | | |
|---|---|---|
| KR | 10-2014-0120404 A | 10/2014 |
| KR | 10-2015-0023897 A | 3/2015 |
| KR | 10-2015-0057984 A | 5/2015 |
| WO | WO 2009/140220 A1 | 11/2009 |
| WO | WO 2014/001983 A1 | 1/2014 |

* cited by examiner

WIRELESS POWER TRANSMITTER AND METHOD FOR CONTROLLING THE SAME

CROSS-REFERENCE TO RELATED APPLICATION(S)

This application claims the benefit under 35 U.S.C. §119(a) of Korean Patent Application Nos. 10-2015-0073218 filed on May 26, 2015 and 10-2015-0134709 filed on Sep. 23, 2015 in the Korean Intellectual Property Office, the entire disclosures of which are incorporated herein by reference for all purposes.

BACKGROUND

1. Field

The following description relates to a wireless power transmitter and a method for controlling the same.

2. Description of Related Art

In accordance with the development of wireless technology, wireless functions range from the transmission of data to the transmission of electrical energy. Particularly, a wireless power charging technology capable of charging an electronic device with electrical power, even in a non-contact state, has recently been developed.

In a wireless power transmission technology according to the related art, in a case in which positions of a wireless power transmitter and/or a wireless power receiver may change, a position of a coil is misaligned, or the like, there is a problem that wireless power transmissions may not be performed or the efficiency thereof may be decreased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a method of controlling a wireless power transmitter, the method includes actuating the wireless power transmitter to transmit a beacon signal; determining approach of an external object according to a detected change in object detection signal; and transmitting ping signals having different frequencies responsive to the determined approach of the external object.

The method may further include adjusting impedance of the wireless power transmitter in response to receiving a signal from a wireless power receiver in response to the ping signals.

Adjusting of the impedance of the wireless power transmitter may include: sequentially transmitting the ping signals to the wireless power receiver, and when a signal in response to a first ping signal of the ping signals is received, setting the impedance of the wireless power transmitter to an impedance corresponding to the first ping signal.

Adjusting of the impedance of the wireless power transmitter may include: when a signal is received from the wireless power receiver in response to the ping signals, identifying signal strength for the a response signal; and setting the impedance of the wireless power transmitter to an impedance of the ping signal corresponding to the response signal having the strongest signal strength.

Transmitting of the ping signals may include changing capacitance of a variable resonator included in the wireless power transmitter; and in response to the capacitance being changed, transmitting a ping signal of the ping signals using the variable resonator.

The transmitting of the ping signals may include transmitting a first ping signal using a variable resonator having a first capacitance; setting capacitance of the variable resonator to a second capacitance higher than the first capacitance by controlling a switch connected to a variable capacitor of the variable resonator; and transmitting a second ping signal using the variable resonator having the second capacitance.

The method may further include: wirelessly transmitting power to the wireless power receiver at the adjusted impedance.

Wirelessly transmitting of power to the wireless power receiver may include upon a change of a control variable being sensed in the wireless transmitting of power, adjusting the impedance of the wireless power transmitter, accordingly.

According to another general aspect, a wireless power transmitter, includes: a power transmitter configured to wirelessly transmit power using a variable resonator; and a controller configured to control the power transmitter to transmit ping signals having different respective frequencies, and to control the variable resonator based on a response signal.

The power transmitter may include a variable capacitor coupled to the variable resonator; an inverter including switches coupled to the variable resonator; and a capacitance controller configured to adjust a capacitance of the variable capacitor.

The controller may be configured to control the power transmitter to transmit the ping signals when a capacitance of the variable resonator transmitting a beacon signal is changed.

The controller may be configured to control the power transmitter to sequentially increase the capacitance of the variable capacitor and transmit the ping signals in response to the capacitance being changed.

The controller may be configured to sequentially transmit the ping signals to a wireless power receiver and change a capacitance of the power transmitter to an impedance corresponding to a first ping signal of the plurality of ping signals upon a signal in response to the first ping signal being received.

The controller may be configured to identify a signal strength for the response signal upon the response signal being received from a wireless power receiver in response to one of the ping signals and change a capacitance of the power transmitter to correspond to an impedance of the ping signal corresponding to the response signal having the strongest signal strength.

The controller may be configured to control the power transmitter to wirelessly transmit power to the wireless power receiver and adjust the capacitance of the power transmitter upon a change of control variable being sensed during wireless power transmission.

According to another general aspect, a wireless power receiver, includes: a resonator configured to receive a wireless transmission; and, a modulator coupled to the resonator and configured to modulate a data feed responsive to the received wireless transmission to encode an operational characteristic of the wireless power receiver to adaptively adjust the wireless transmission for reception of power.

The wireless power receiver may further include a controller coupled to the modulator, the controller configured to provide the data feed including an operational characteristic of state information, capacity information of a load, required voltage gain, or combinations thereof, to the modulator.

The modulator may include a network of capacitors coupled to at least one switch configured for selective switching of the capacitors responsive to the data feed.

The wireless power receiver may further include a position identification capacitor coupled to the resonator, the position identification capacitor configured to identify a position of a resonance circuit of a wireless power transmitter relative to the wireless power receiver.

The modulator may include a resistor coupled to a switch configured to selectively switch the resistor responsive to the data feed.

Other features and aspects will be apparent from the following detailed description, the drawings, and the claims.

BRIEF DESCRIPTION OF THE DRAWINGS

The above and other aspects, features and other advantages of the present disclosure will be more clearly understood from the following detailed description taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the example embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting. As used herein, the singular forms "a," "an," and "the" are intended to include the plural forms as well, unless the context clearly indicates otherwise. It will be further understood that the terms "include", "includes", "including, "comprise", "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present description will be described with reference to the provided example schematic views. In the drawings, for example, due to manufacturing techniques and/or tolerances, modifications of the shape shown may result. Thus, the example embodiments should not be construed as being limited to the particular shapes of regions shown herein. But should, for example, include changes in shape resulting from manufacturing. The following embodiments may also be constituted by one or a combination thereof.

The methods, apparatuses, and/or systems described below may have a variety of configurations and are not limited thereto.

Figure 1:
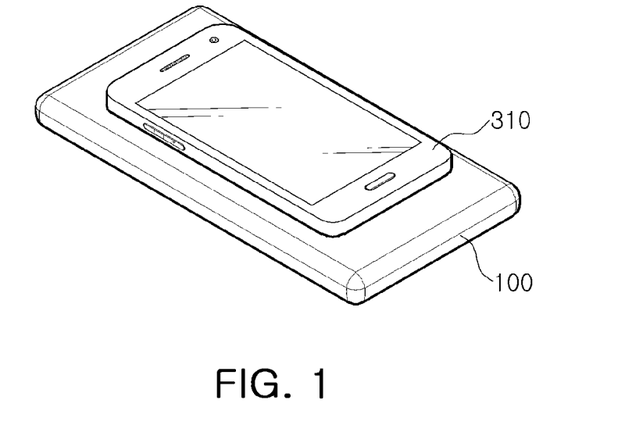
FIG. 1 is a diagram illustrating an example in which a wireless power transmitter according to an embodiment is applied.
Figure 2:
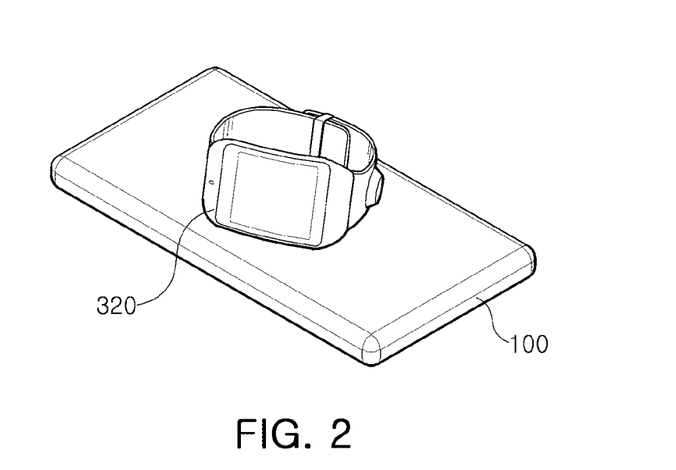
FIG. 2 is a diagram illustrating another example in which the wireless power transmitter according to an embodiment is applied.

FIG. 1 is a diagram illustrating an example in which a wireless power transmitter according to an example embodiment is applied and FIG. 2 is a diagram illustrating another example in which the wireless power transmitter according to an example embodiment is applied.

FIG. 1 illustrates an example in which a wireless power transmitter 100 charges a mobile terminal 310, and FIG. 2 illustrates an example in which the wireless power transmitter 100 charges a wearable device 320.

The mobile terminal 310 and the wearable device 320 may respectively be connected to a wireless power receiver (not illustrated). The wireless power receiver wirelessly receives power from the wireless power transmitter 100 and provides required power to the mobile terminal 310 or the wearable device 320.

As such, the wireless power receiver may be applied to various electronic devices in addition to the illustrated mobile terminal 310 or wearable device 320.

Since the wireless power receiver 200 (as seen, for example, in FIGS. 10 and 11) may have other charging characteristics, for example, a change in impedance, and the like, depending on the electronic devices to which the wireless power receiver 200 is applied, the wireless power transmitter 100 according to an example embodiment in the following description may support various charging characteristics in order to support wireless power transmissions for various devices.

Similarly, since the charging characteristics may change with a change in a distance and/or a position between the wireless power receiver 200 and the wireless power transmitter 100, wireless charging may be performed efficiently by providing various charging characteristics through the wireless power transmitter 100 according to an example embodiment.

According to an embodiment, in the case in which the charging characteristics are changed as described above, the wireless power transmitter remains capable of stably transmitting power by adaptively varying the impedance depending on the charging characteristics. A ping operation may be provided for the same.

Hereinafter, various embodiments will be described in more detail with reference to FIGS. 3 through 12.

Figure 3:
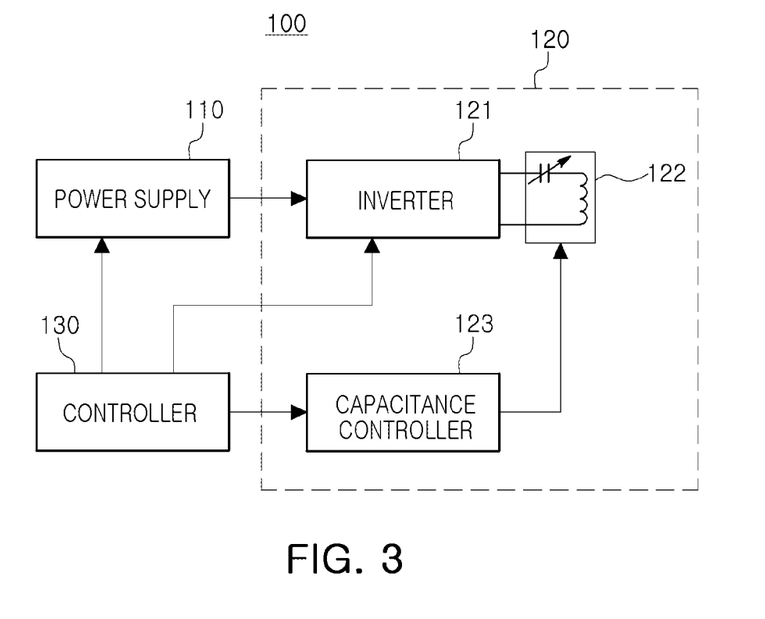
FIG. 3 is a block diagram illustrating a wireless power transmitter according to an embodiment.

FIG. 3 is a block diagram illustrating a wireless power transmitter according to an embodiment.

Referring to FIG. 3, the wireless power transmitter 100 includes a power supply 110, a power transmitter 120, and a controller 130.

The power supply 110 generates a predetermined level of power using power input from an external source. The power provided by the power supply 110 is provided to the power transmitter 120.

The power transmitter 120 operates a variable resonator 122 using power provided by the power supply 110 and wirelessly transmits power to the wireless power receiver.

The power transmitter 120 includes an inverter 121, the variable resonator 122, and a capacitance controller 123.

The inverter 121 is operated according to control by the controller 130 and operates the variable resonator 122 using power provided by the power supply 110.

The variable resonator 122 includes a variable capacitor and an inductor. The variable resonator 122 provides variable impedance. Thus, the wireless power transmitter 100 wirelessly transmits power to various kinds of wireless power receivers or wireless power receivers in various positions.

The capacitance controller 123 adjusts capacitance of the variable capacitor included in the variable resonator 122.

The controller 130 controls the power supply 110 and the power transmitter 120.

The controller 130 may include at least one processor. Depending on the example embodiments, the controller 130 may further include a memory. The processor may include, for example, a central processing unit (CPU), a graphic processing unit (GPU), a microprocessor, an application specific integrated circuit (ASIC), field programmable gate arrays (FPGA), and the like, and may have a plurality of cores. The memory may be a volatile memory (e.g., a RAM, or the like), a non-volatile memory (a ROM, a flash memory, or the like), or a combination thereof.

The controller 130 performs control operations such that the variable resonator 122 transmits a small, low power and/or low duty cycle predetermined signal (hereinafter, referred to as a beacon signal). The beacon signal is used to sense access or presence when an arbitrary object accesses or comes within range of the wireless power transmitter.

For example, if a change in impedance of the variable resonator 122 that transmits the beacon signal is sensed, the controller 130 may identify access or presence of an external object within a predetermined range.

If access or presence of the external object is identified, the controller 130 transmits a ping signal in order to identify whether or not the corresponding object is a wireless power receiver. That is, if the change in impedance of the variable resonator 122 that transmits the beacon signal is sensed, the controller 130 controls the power transmitter 120 to transmit the ping signal to determine if the arbitrary object is indeed a wireless power receiver. Further, the ping signal may also operate with more granularity to identify the wireless power receiver and determine whether it is an intended or compatible wireless power receiver.

Here, the controller 130 controls the power transmitter 120 so as to transmit a plurality of ping signals having different frequencies. That is, if the ping signal is transmitted at a fixed frequency, the ping signal may not be properly transmitted to the wireless power receiver when types of electronic device to which the wireless power receiver is applied are different, or a change in a position of the wireless power receiver, or the like occurs.

Thus, the wireless power transmitter 100 transmits the plurality of ping signals having various frequencies or resonance impedance levels so that the ping signals may be successfully provided even in various wireless charging states.

The controller 130 changes the frequency or the resonance impedance of the ping signal by adjusting impedance of the variable resonator.

The controller 130 controls the variable resonator 122 based on a response signal from the wireless power receiver for the plurality of ping signals.

The controller 130 may control an operation of the power supply 110 and/or the power transmitter 120.

The controller 130 changes impedance of the power transmitter 120. According to an embodiment in the present disclosure, the power transmitter 120 includes the variable resonator including the variable capacitor, and the controller 130 changes the impedance of the power transmitter 120 by adjusting the variable capacitor.

If the controller 130 senses a change in a control variable during a process in which power is wirelessly transmitted to the wireless power receiver, the controller 130 adjusts capacitance of the power transmitter 120 so that a voltage gain of the power transmitter 120 is increased. Here, the control variable may be an input voltage, an input frequency, or other suitably measurable characteristic of the power transmitter 120.

For example, the controller 130 detects the input voltage of the power transmitter 120. When the detected input voltage is changed, the controller 130 adjusts the impedance of the variable resonator 122, accordingly. That is, the controller 130 performs controlling so that the capacitance of the variable resonator 122 is changed. The controller 130 identify a change in the input voltage of the power transmitter 120 depending on a change in the capacitance of the variable resonator 122, and changes the capacitance of the variable resonator 122 so that the power transmitter 120 has a high voltage gain. Here, the controller 130, for example, may receive information on the input voltage from the wireless power receiver in an in-band manner in order to calculate the voltage gain. However, other suitable measures for determining and/or communicating changes in the control variable(s) may be employed.

If the signal in response to any one of the plurality of ping signals is received from the wireless power receiver, the controller 130 changes the capacitance of the power transmitter 120 so as to correspond to an impedance of the ping signal corresponding to the response signal.

If at least one signal is received from the wireless power receiver in response to the plurality of ping signals, the controller 130 identifies signal strength of the at least one response signal. The controller 130 then changes the capacitance of the power transmitter 120 so that the signal strength corresponds to impedance of the strongest ping signal.

Figure 4:
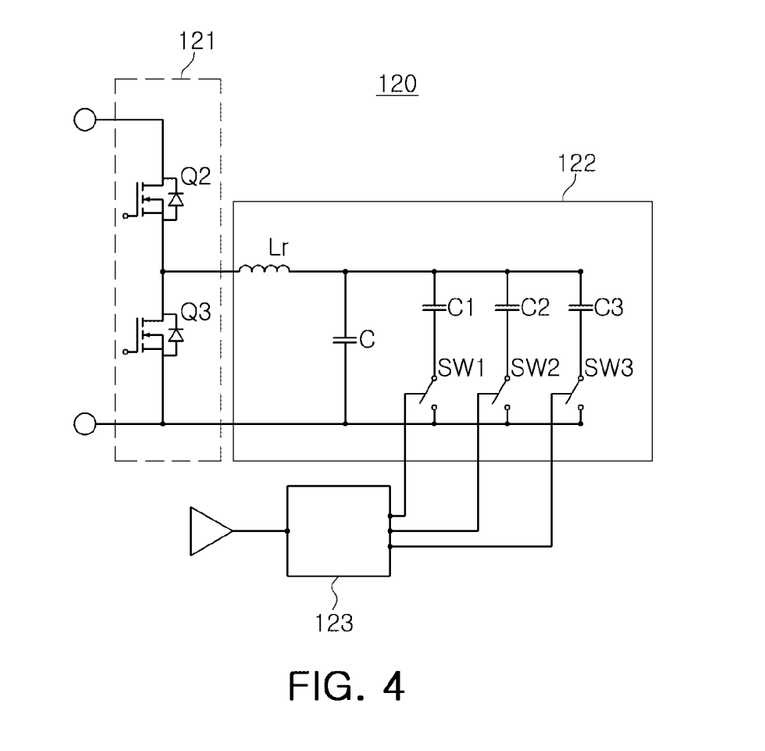
FIG. 4 is a circuit diagram illustrating a wireless power transmitter according to an embodiment.

FIG. 4 is a circuit diagram illustrating an example of the power transmitter illustrated in FIG. 3.

The power transmitter 120 transmits the beacon signal or the ping signal according to controlling by the controller 130 (illustrated in FIG. 3). Alternatively, the power transmitter 120 may wirelessly transmit power according to the control of the controller 130 (illustrated in FIG. 3).

The power transmitter 120 includes the inverter 121, the variable resonator 122, and the capacitance controller 123.

The inverter 121 includes a plurality of switches. The inverter 121 performs a switching operation according to the control of the controller 130 (illustrated in FIG. 3) to operate the variable resonator 122.

In the illustrated example, the inverter 121 is a half-bridge inverter in which two switches Q2 and Q3 are connected to each other in series, but this is merely illustrative. The inverter 121 is not limited to the half-bridge inverter. Thus, for the inverter 121, different kinds of inverters such as a full-bridge inverter, and the like may also be used. The inverter 121 may be controlled in a fixed frequency manner, a variable frequency manner, a duty-ratio modulation manner, a phase shift manner, an inverter voltage control manner, and the like.

The variable resonator 122 includes a variable capacitor, or a capacitor network including at least one capacitor, and the inductor.

The variable resonator 122 includes the variable capacitor of a ladder structure. For example, as illustrated in FIG. 4, the variable resonator 122 includes a plurality of capacitors C (C1 to C3) which are connected to each other in parallel, and a plurality of switches SW1 to SW3 which are connected to at least a portion of the plurality of capacitors in series. As the capacitance of the variable resonator 122 is varied by the variable capacitor, the impedance of the variable resonator 122 is changed.

The capacitance controller 123 adjusts the capacitance of the variable resonator 122 in response to a control signal provided by the controller 130 (illustrated in FIG. 3). The controller 130 (illustrated in FIG. 3) controls the capacitance controller 123 to adjust impedance of the ping signal or adjust impedance of power which is being wirelessly transmitted.

According to an embodiment, the controller 130 (illustrated in FIG. 3) controls the variable resonator 122 so that the capacitance of the variable capacitor is sequentially increased, and controls the power transmitter 120 so that the ping signal is transmitted whenever the capacitance is changed.

The above-mentioned example illustrates the case in which the variable resonator includes the variable capacitor, but is merely illustrative. Thus, the variable resonator may also include a variable inductor, or both variable capacitor and variable inductor.

Figure 5:
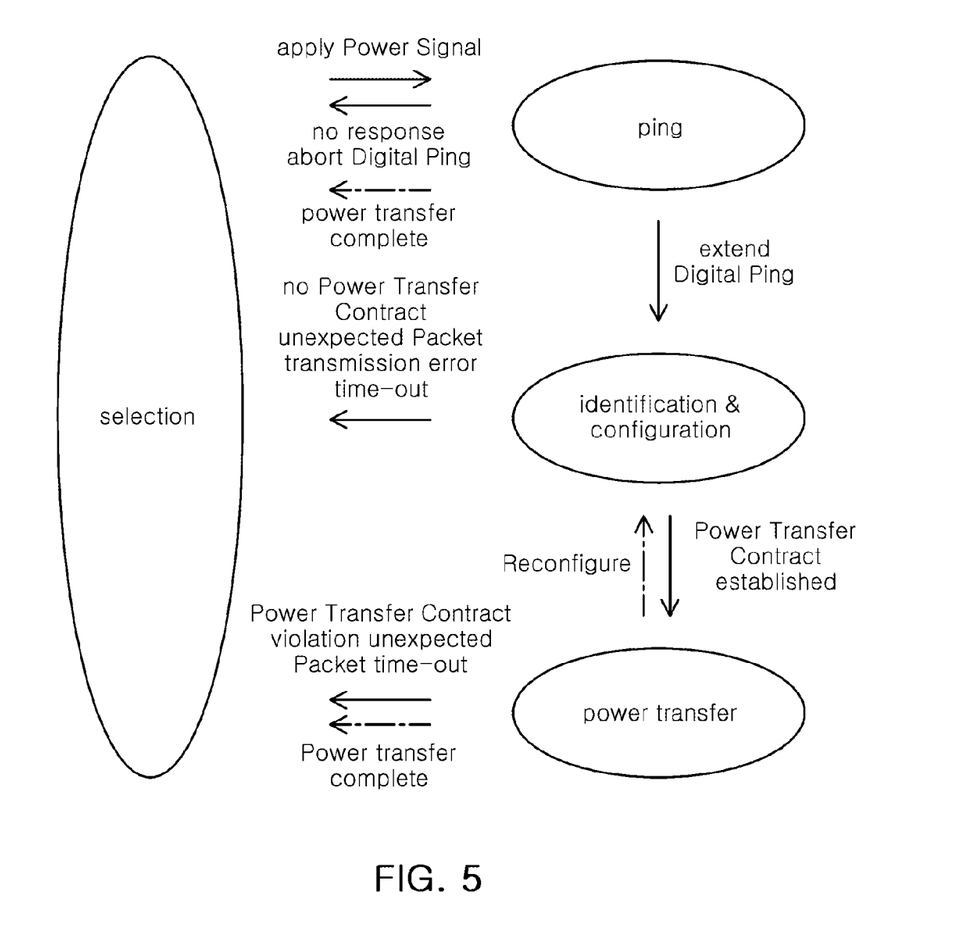
FIG. 5 is a diagram illustrating example phases of a wireless power transmission.

FIG. 5 is a flow chart illustrating the respective phases of an example wireless power transmission.

Referring to FIG. 5, in order to wirelessly transmit power, a selection phase is initially performed. In the selection phase, the wireless power transmitter transmits the beacon signal through a resonating unit.

If a change for the beacon signal (e.g., a change in impedance, or the like) which is being transmitted occurs, the wireless power transmitter determines that a specific external object is positioned around the wireless power transmitter.

If it is determined that a predetermined external object is adjacent in the selection phase, it is determined whether a target object is the wireless power receiver using the ping signal. This is referred to as a ping phase.

According to an embodiment, a plurality of ping signals are transmitted and impedance levels of the respective ping signals are set to be different from each other, such that the ping signals may be successfully transmitted and received even in a case in which a type or a position of the wireless power receiver is changed.

If the wireless power receiver receives the ping signals, the wireless power receiver transmits a signal in response to the ping signals. The response signal includes at least one of signal strength information, information on a kind of the wireless power receiver, information on required power, information on input voltage strength, or combinations thereof.

Thus, the wireless power transmitter identifies a target and a power requirement using the response signal from the wireless power receiver for the ping signals (which may include both identification and/or configuration information).

Thereafter, the wireless power transmitter wirelessly provides power using the identified information (power transfer phase).

As described above, the wireless power transmitter transmits the ping signals having various frequencies by varying the capacitance of the variable resonator, in the ping phase. That is, the wireless power transmitter performs an adaptive impedance matching in the ping phase. Thus, the ping phase for wireless power transmissions may be successfully performed in various environments between the wireless power transmitter and the wireless power receiver.

Further, the wireless power transmitter may also perform the adaptive impedance matching by varying the capacitance of the variable resonator, in the power transfer phase. As a result, power may be efficiently transmitted, even in the case that the control variable is changed.

Hereinafter, various embodiments of a method of controlling a wireless power transmitter will be described with reference to FIGS. 6 through 9.

Figure 6:
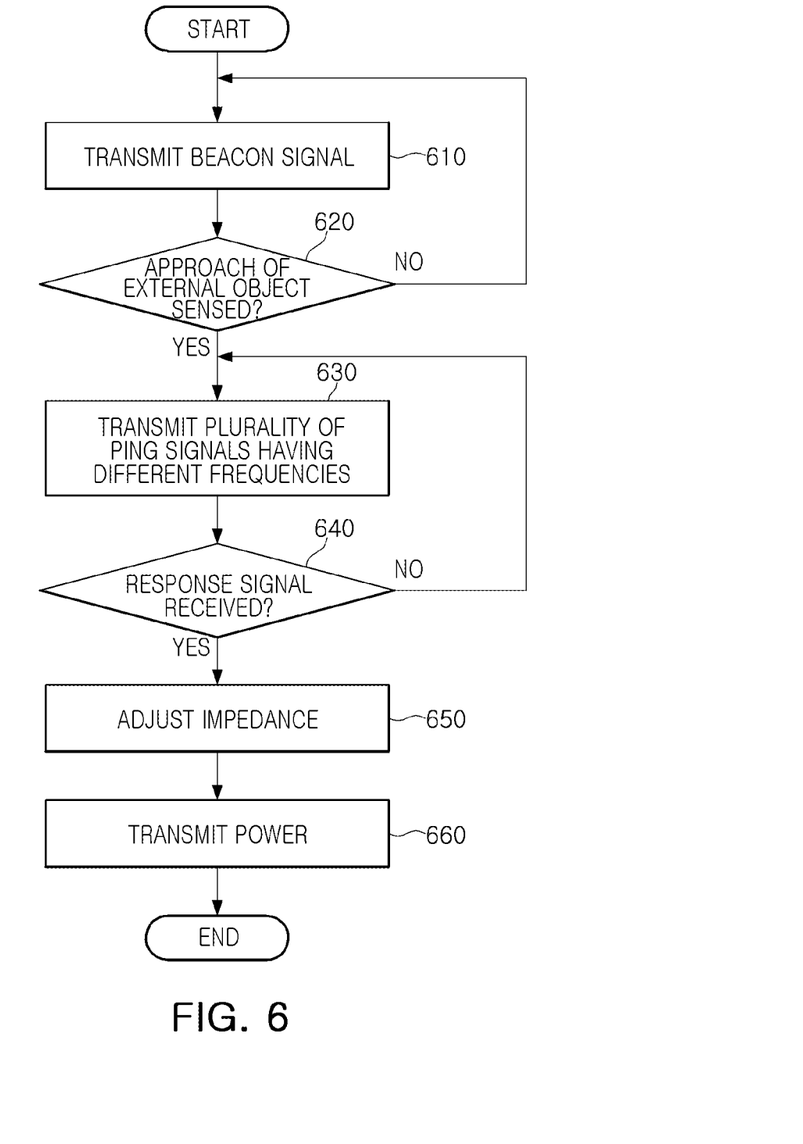
FIG. 6 is a flow chart illustrating a method of controlling a wireless power transmitter according to an embodiment.

FIG. 6 is a flow chart illustrating a method of controlling a wireless power transmitter according to an embodiment.

Referring to FIG. 6, the wireless power transmitter transmits a beacon signal (610).

The wireless power transmitter determines presence of an external object depending on whether or not the beacon signal is changed (620).

If it is determined that the external object is present (Yes, in 620), the wireless power transmitter transmits a plurality of ping signals having different frequencies (630).

According to an embodiment of the operation of 630, the operation of transmitting the plurality of ping signals includes an operation of changing capacitance of a variable resonator included in the wireless power transmitter; and an operation of transmitting the ping signals using the variable resonator of which the capacitance is reconfigured responsive to a detected change in capacitance of the ping signals or beacon signal.

According to an embodiment of the operation of 630, the operation of transmitting the plurality of ping signals includes an operation of transmitting a first ping signal using a variable resonator included in the wireless power transmitter having a first capacitance; an operation of setting capacitance of the variable resonator to a second capacitance greater than the first capacitance by controlling a switch connected to a variable capacitor of the variable resonator; and an operation of transmitting a second ping signal using the variable resonator having the second capacitance.

If the wireless power transmitter receives a signal in response to at least a portion of the plurality of ping signals (Yes, in 640), impedance of the variable resonator of the wireless power transmitter is adjusted in response to the corresponding response signal.

If the response signal is not received (No, in 640), the ping signals may be retransmitted (630) as illustrated, and although not illustrated, the ping signals may not be transmitted and, instead, the beacon signal may be transmitted (610).

The wireless power transmitter wirelessly provides power to the wireless power receiver using the variable resonator of which impedance is adjusted.

Figure 7:
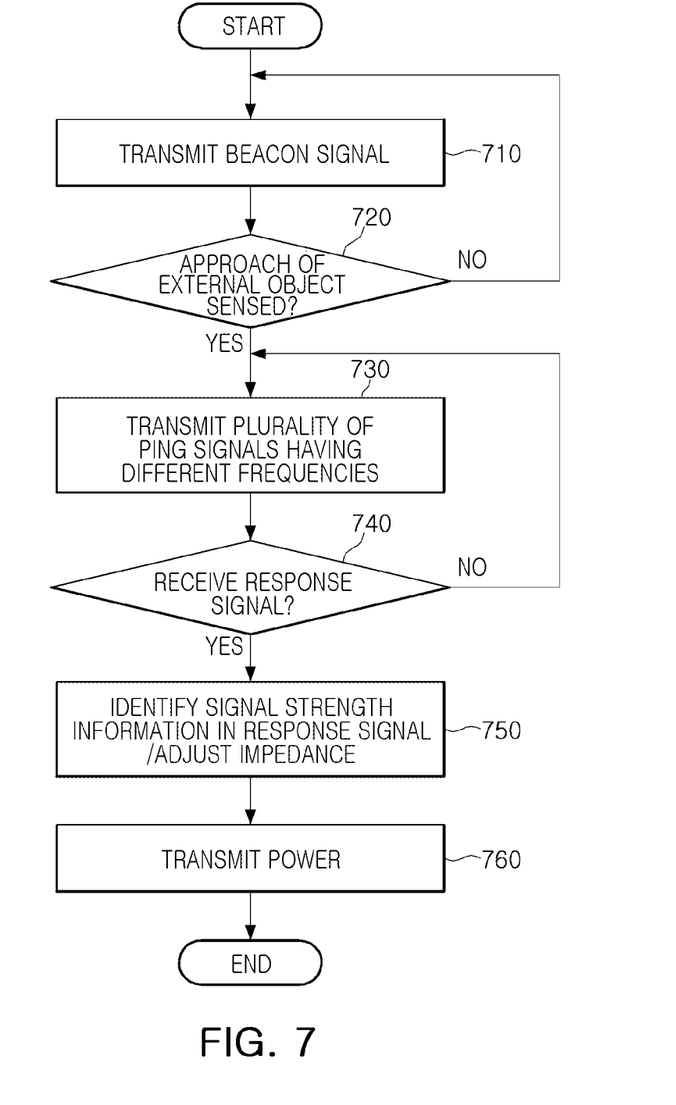
FIG. 7 is a flow chart illustrating a method of controlling a wireless power transmitter according to another embodiment.

FIG. 7 is a flow chart illustrating a method of controlling a wireless power transmitter according to another embodiment in the present disclosure.

In another embodiment in the present disclosure illustrated in FIG. 7, the remaining operations except for an operation (750) of adjusting impedance may be understood from the embodiment described above in FIG. 6. Hereinafter, the operation (750) of adjusting the impedance will be described.

If at least one signal having a different frequency is received in response to the plurality of ping signals, the wireless power transmitter identifies a signal strength for the at least one response signal.

Thereafter, the wireless power transmitter sets an impedance of a variable resonator of the wireless power transmitter to match impedance of the ping signal having the strongest signal strength.

That is, in a case in which the plurality of ping signals having different frequencies are transmitted, even if the wireless power receiver is singular, resonance may be formed with at least one of the plurality of ping signals. However, since the plurality of ping signals have different impedance levels, the response signal for the ping signal having the best impedance matching with the wireless power receiver may have the strongest signal strength.

Thus, in the case of the embodiment of FIG. 7, impedance matching between the wireless power receiver and the wireless power transmitter is initially optimized in the ping phase. As a result, efficiency of the transmission of power is increased.

Figure 8:
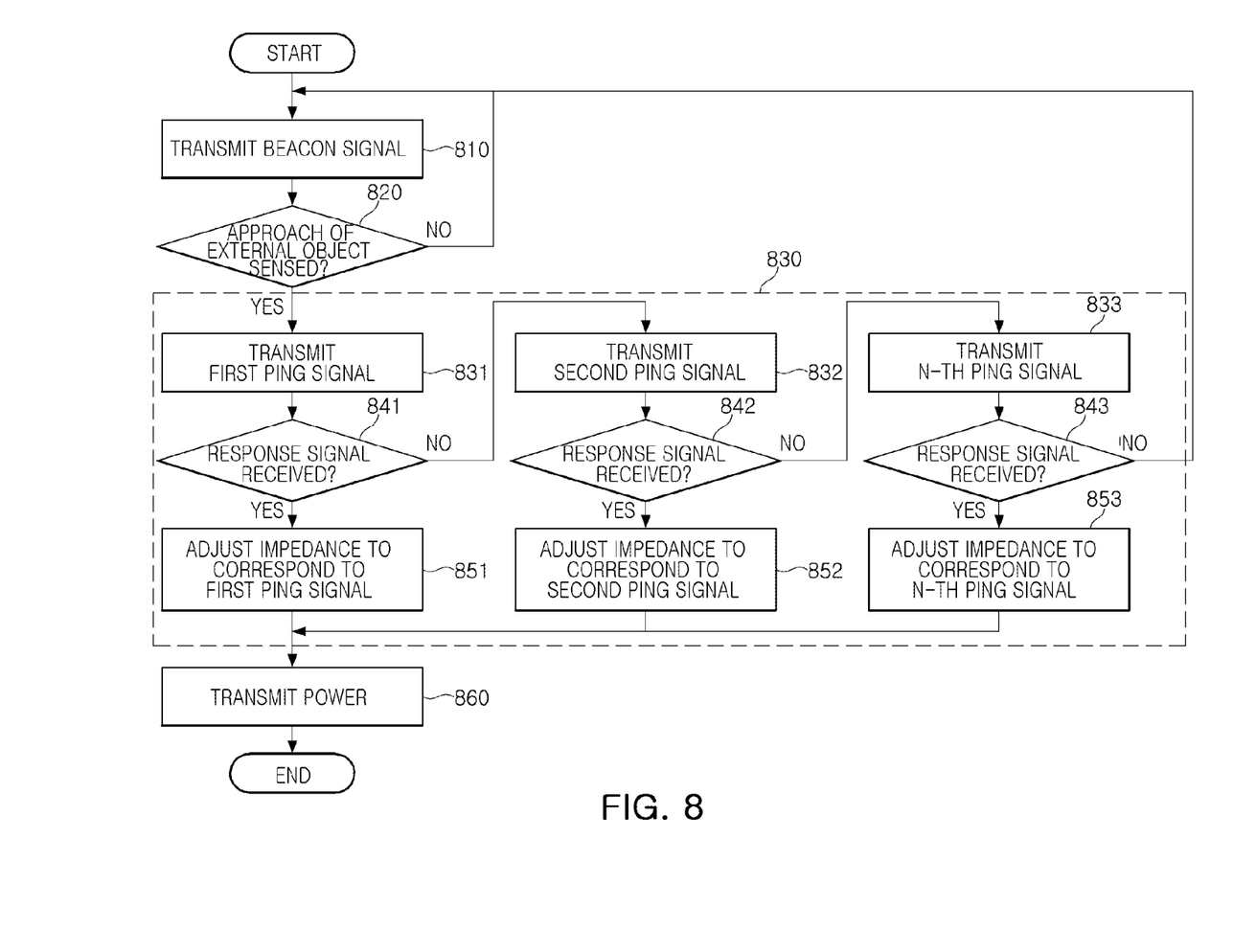
FIG. 8 is a flow chart illustrating a method of controlling a wireless power transmitter according to another embodiment.

FIG. 8 is a flow chart illustrating a method of controlling a wireless power transmitter according to another embodiment in the present disclosure.

Referring to FIG. 8, the wireless power transmitter transmits a beacon signal (810) and senses access or presence of an external object (820) such as by detecting a change in impedance.

The wireless power transmitter sequentially transmits a plurality of ping signals. After the wireless power transmitter determines whether or not a signal in response to each of the ping signals has been received, the wireless power transmitter transmits a following ping signal.

That is, the wireless power transmitter transmits a first ping signal having a first frequency (831). If a signal in response to the first ping signal is received (Yes, in 841), the wireless power transmitter adjusts a variable resonator so as to have first impedance corresponding to the first ping signal (851).

Meanwhile, if the signal in response to the first ping signal is not received (No, in 841), the wireless power transmitter transmits a second ping signal having a second frequency (832) and adjusts the variable resonator (851) depending on whether or not a signal in response to the second ping signal is received (842).

The above-mentioned operations may be repeated until an n-th ping signal having an n-th frequency has been transmitted and a response signal is eventually received.

However, if the signal in response to any ping signal is received, the wireless power transmitter performs the transmission of power without transmitting the ping signals of the subsequent ping operation (860).

As such, according to the present embodiment, the wireless power transmitter transmits the ping signals. After the wireless power transmitter identifies the signal in response to the corresponding ping signal, the wireless power transmitter does not transmit the next ping signal. In contrast, according to the embodiment described above in FIG. 7, after the wireless power transmitter transmits the plurality of ping signals, the wireless power transmitter receives and processes the response signal. On the other hand, according to the present example embodiment, the wireless power transmitter determines whether or not the response signal for each of the ping signals has been received one by one and determines whether to transmit the next ping signal if no response has been received.

Thus, according to the present embodiment, since there is a possibility that all of the ping signals are not transmitted, the ping phase may be more quickly completed.

Figure 9:
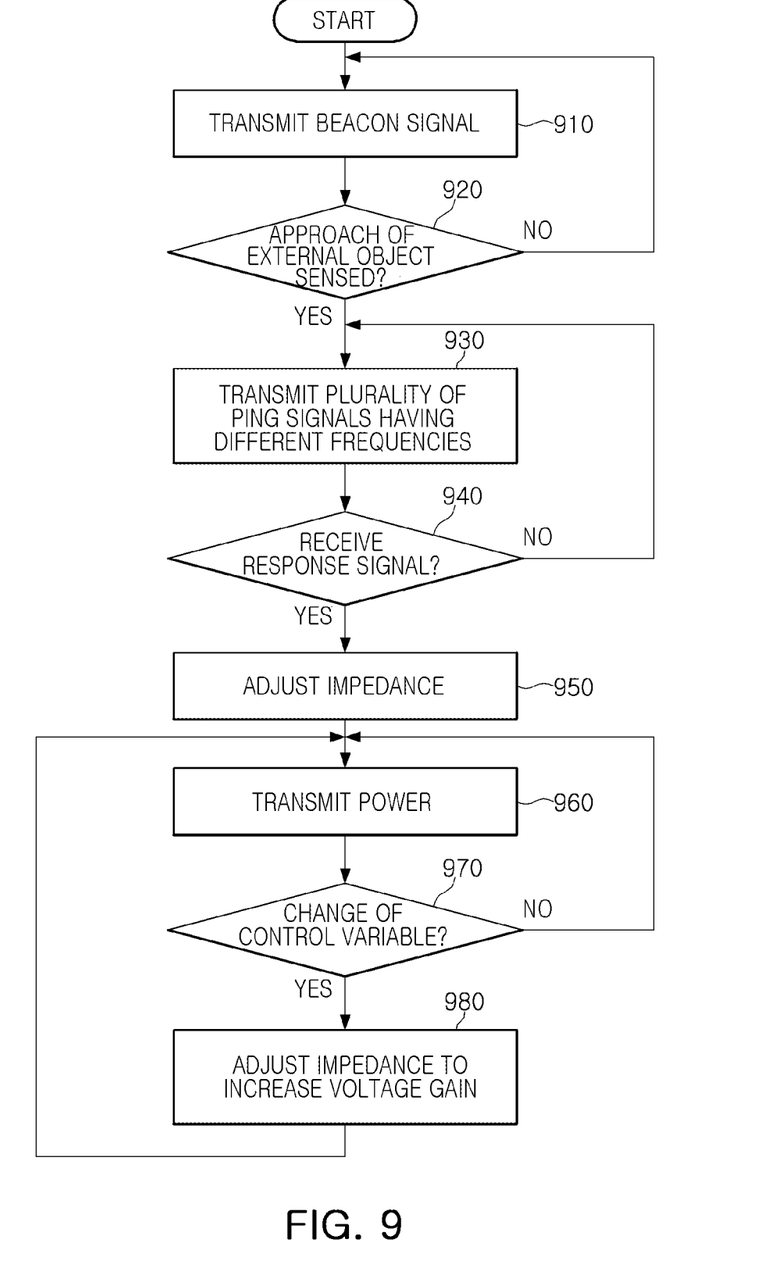
FIG. 9 is a flow chart illustrating a method of controlling a wireless power transmitter according to another embodiment.

FIG. 9 is a flow chart illustrating a method of controlling a wireless power transmitter according to another embodiment.

An embodiment illustrated in FIG. 9 relates to an example in which an impedance adjustment is performed during a process in which power is wirelessly transmitted. Thus, in connection with operations 910 to 950 of transmitting the plurality of ping signals and adjusting impedance, the embodiments described above in FIGS. 6 through 8 may be applied. Accordingly, for conciseness and clarity, they will not be repeated here.

After the wireless power transmitter adjusts the impedance according to the response signal, the wireless power transmitter performs transmission of power (960).

However, a control variable may be changed by a movement of the wireless power receiver, or the like, even during the transmission of power. Thus, if a change in the control variable is sensed (Yes, in 970), the wireless power transmitter adjusts impedance of a power transmitter accordingly, for example, the variable capacitor is adjusted.

The control variable and the impedance adjustment may be understood from the description of FIGS. 3 and 4.

Hereinafter, various embodiments of a wireless power receiver according to the present disclosure will be described with reference to FIGS. 10 through 12.

Figure 10:
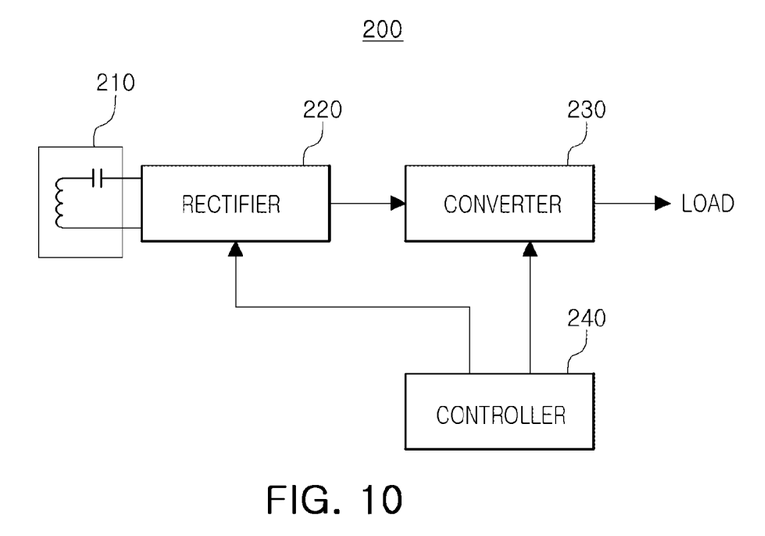
FIG. 10 is a circuit diagram illustrating a wireless power receiver according to an embodiment.

FIG. 10 is a block diagram illustrating a wireless power receiver according to an embodiment in the present disclosure.

Referring to FIG. 10, a wireless power receiver 200 includes a resonator 210 and a rectifier 220. Depending on the embodiments, the wireless power receiver 200 may further include a converter 230 and/or a controller 240, or both.

The resonator 210 includes a resonance circuit. The resonance circuit of the wireless power receiver 200 is magnetically coupled to the resonance circuit of the wireless power transmitter to receive wirelessly transmitted power.

The rectifier 220 rectifies power received by the resonator 210.

The converter 230 converts the rectified power to a level required by a load.

The controller 240 controls an operation of the rectifier 220 and/or the converter 230 to wirelessly receive power, and/or convert the received power to be provided to the load.

In a state in which the wireless power receiver 200 is magnetically coupled to the wireless power transmitter 100, the wireless power receiver 200 transmits the response signal to the wireless power transmitter for example, in an in-band manner by modulating predetermined data; however, any suitable measures for transmitting response signals may be used such as an out of band (OOB) short-range wireless communication channel employing BLUETOOTH®, WiFi®, or the like.

Hereinafter, various embodiments of a wireless power receiver including a modulator will be described with reference to FIGS. 11 and 12.

Figure 11:
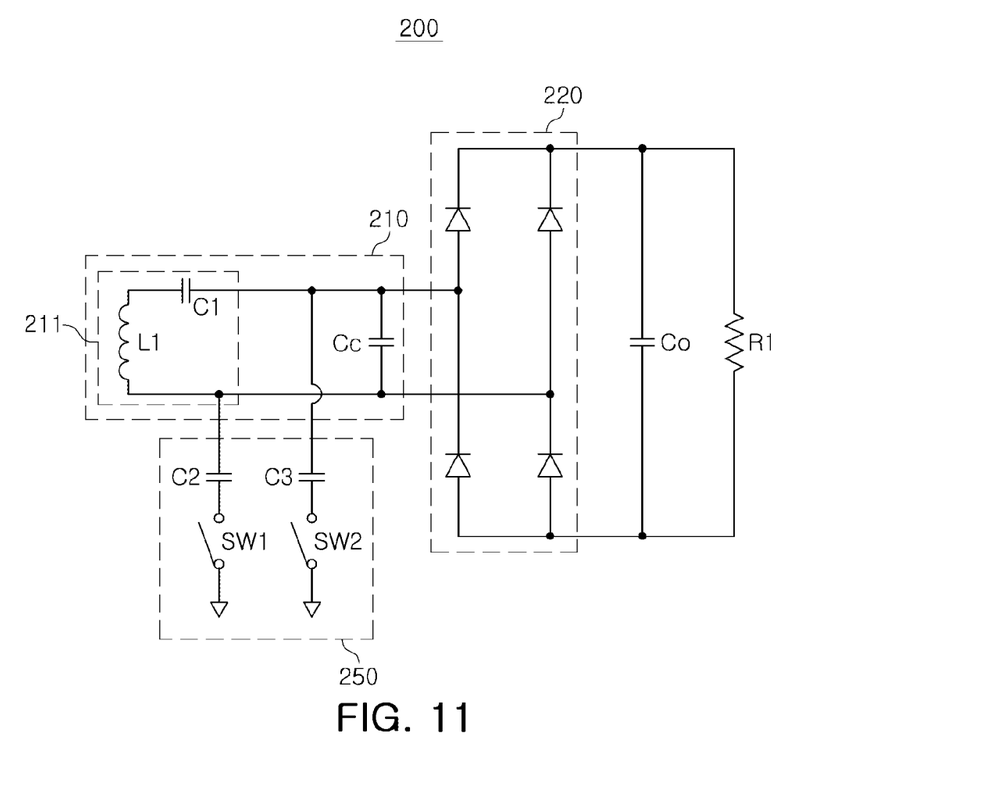
FIG. 11 is a circuit diagram illustrating a wireless power receiver according to another embodiment.

FIG. 11 is a circuit diagram illustrating a wireless power receiver according to an embodiment.

Referring to FIG. 11, a wireless power receiver 200 includes a resonator 210 and a rectifier 220. According to an embodiment, the wireless power receiver 200 further includes a capacitive modulator 250.

The resonator 210 includes a resonance circuit 211.

The resonance circuit 211 is configured to be magnetically coupleable to the resonance circuit 131 (FIG. 3) of the wireless power transmitter to wirelessly receive power.

According to an embodiment, the resonator 210 includes a position identification capacitor Cc. The position identification capacitor Cc identifies a position of the resonance circuit of the wireless power transmitter. That is, a resonance inductor L1 and the position identification capacitor Cc configure a separate resonance circuit. The separate resonance circuit of CC and L1 resonates with the resonance circuit of the wireless power transmitter to identify a mutual position.

The rectifier 220 rectifies power received by the resonator 210 and the rectified power is stored in an output capacitor Co and is then provided to a load R1.

The capacitive modulator 250 includes at least one switch connected to the resonance circuit 211. The illustrated example illustrates a pair of switches SW1 and SW2, but is not limited thereto.

According to the embodiment illustrated, the capacitive modulator 250 includes capacitors C2 and C3 which are each connected to both ends of the resonance inductor L1, and the switches SW1 and SW2 are respectively connected to the capacitors C2 and C3.

A controller (not illustrated) may adjust switching of the switches SW1 and SW2 and provide modulation data to the wireless power transmitter using a resonance current. The modulation data may include one or more of various types of information such as state information or capacity information of the load, a required voltage gain, and the like.

Figure 12:
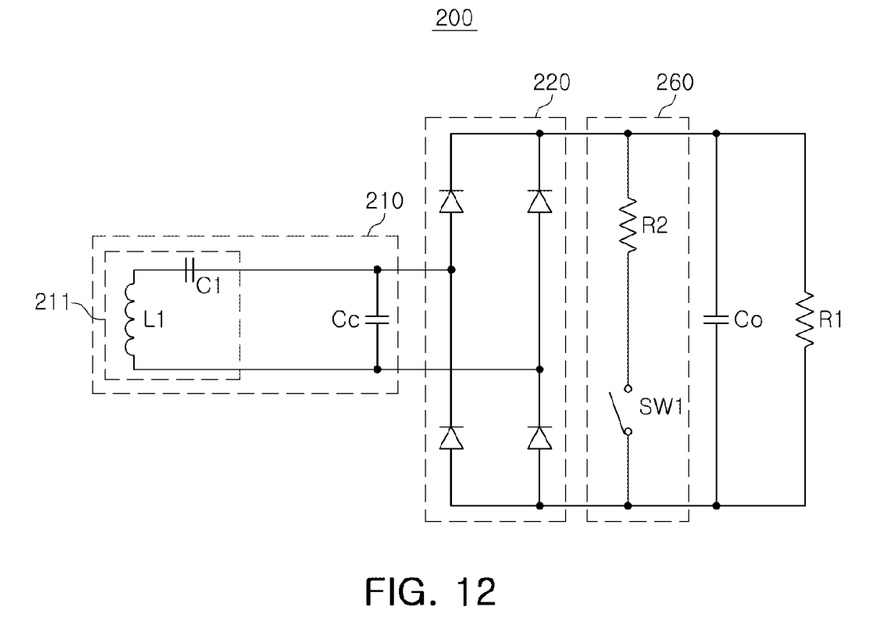
FIG. 12 is a circuit diagram illustrating a wireless power receiver according to another embodiment.

FIG. 12 is a circuit diagram illustrating a wireless power receiver according to another embodiment. FIG. 12 illustrates an embodiment in which information is transmitted through resistive modulation of an in-band wireless power transmission using the resonance circuit.

Referring to FIG. 12, the wireless power receiver 200 includes the resonator 210, the rectifier 220, and a resistive modulator 260.

The resistive modulator 260 is connected in parallel to the rectifier 220.

The resistive modulator 260 includes a resistor R2 and a switch SW1. A controller (not illustrated) may adjust switching of the switch SW1 and may provide modulation data to the wireless power transmitter using a resonance current.

The resonator 210, the rectifier 220, the output capacitor Co, and the load R1 may be understood from the description of FIG. 10 and for clarity and conciseness will not be repeated here.

As set forth above, according to the embodiments, the wireless power transmitter may efficiently transmit power even in a case in which a charging distance is changed, or the positions of the wireless power receiver and the wireless power transmitter are not matched.

The wireless power transmitter, according to an embodiment, may transmit power at high efficiency from the start of a power transmission.

The apparatuses, units, modules, devices, and other components (e.g., power supply 110, controller 130, power transmitter 120, controller 130, processor, resonator 210, rectifier 220, converter 230, controller 240, and the like) illustrated in FIGS. 2 and 4 that perform the operations described herein with respect to FIGS. 1-4 and 10-12 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 5-9. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5-9 that perform the operations described herein are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a mobile terminal as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of controlling a wireless power transmitter, the method comprising:
   actuating the wireless power transmitter to transmit a beacon signal;
   determining approach of an external object according to a detected change in the beacon signal;
   transmitting ping signals having different frequencies responsive to the determined approach of the external object; and wirelessly transmitting power to a wireless power receiver based upon a ping signal receipt indication by a wireless power receiver, wherein, the wireless transmitting of power includes adjusting an impedance of a variable resonator of the wireless power transmitter according to a sensed change of a control variable during the wireless transmitting of power, the adjusting of the impedance according to the sensed change being performed to increase a voltage gain of the power transmission to the wireless power receiver over a power transmission to the wireless power receiver with the changed control variable and without the adjusted impedance according to the sensed change.

2. The method of claim 1, wherein the transmitting of the ping signals further comprises adjusting impedance of the variable resonator in response to a received signal from the wireless power receiver that is in response to the ping signals.

3. The method of claim 2, wherein the adjusting of the impedance in response to the received signal comprises:

sequentially transmitting the plurality of ping signals to the wireless power receiver, and when a first signal in response to a first ping signal of the ping signals is received, setting the impedance of the wireless power transmitter to an impedance corresponding to the first ping signal.

4. The method of claim 2, wherein the adjusting of the impedance in response to the received signal comprises:

when the signal is received from the wireless power receiver in response to the ping signals, identifying a signal strength for each of one or more received response signals through the variable resonator, including the received signal, and setting the impedance of the variable resonator so the power transmitter has an impedance corresponding to the ping signal corresponding to one of the response signals that has a strongest signal strength.

5. The method of claim 2, further comprising:

wirelessly transmitting power to the wireless power receiver at the adjusted impedance.

6. The method of claim 1, wherein the transmitting of the plurality of ping signals comprises:

respectively changing capacitance of the variable resonator included in the wireless power transmitter; and in response to each of the respectively changed capacitances, transmitting a corresponding ping signal of the transmitted ping signals using the variable resonator.

7. The method of claim 1, wherein the transmitting of the plurality of ping signals comprises:

transmitting a first ping signal using the variable resonator having a first capacitance;

setting capacitance of the variable resonator to a second capacitance higher than the first capacitance by controlling a switch connected to a variable capacitor of the variable resonator; and transmitting a second ping signal using the variable resonator having the second capacitance.

8. A method of controlling a wireless power transmitter, the method comprising:

actuating the wireless power transmitter to transmit a beacon signal;

determining approach of an external object according to a detected change in the beacon signal;

transmitting ping signals having different frequencies responsive to the determined approach of the external object;

adjusting impedance of the wireless power transmitter in response to receiving a signal from a wireless power receiver in response to the ping signals;

wirelessly transmitting power to the wireless power receiver, including wirelessly transmitting power to the wireless power receiver at the adjusted impedance; and sensing the wireless power transmitter for indications of electrical characteristic changes, with respect to the wireless transmitting of power at the adjusted impedance, of the wireless power transmitter representing a sensed change of a control variable, wherein the wirelessly transmitting of power to the wireless power receiver further includes:

upon the sensing of the change of the control variable, wirelessly transmitting power to the wireless power receiver with an adjusting of the adjusted impedance of the wireless power transmitter according to the sensed change in the control variable.

9. A wireless power transmitter, comprising:

a power transmitter configured to wirelessly transmit power using a variable resonator; and a controller configured to control the power transmitter to transmit ping signals having different respective frequencies, and to control the variable resonator based on a response signal from a wireless power receiver to enter a power transfer phase with the wireless power transmitter to transfer power to the wireless power receiver, wherein the controller is further configured to adjust an impedance of the variable resonator of the wireless power transmitter according to a sensed change of a control variable during the wireless transmission phase, the adjusting of the impedance according to the sensed change being performed to increase a voltage gain of a power transmission to the wireless power receiver over a power transmission to the wireless power receiver with the changed control variable and without the adjusted impedance according to the sensed change.

10. The wireless power transmitter of claim 9, wherein the power transmitter comprises:

a variable capacitor coupled to the variable resonator;

an inverter comprising switches coupled to the variable resonator; and a capacitance controller configured to adjust a capacitance of the variable capacitor to vary an impedance of the variable resonator.

11. The wireless power transmitter of claim 10, wherein the controller is configured to control the power transmitter to transmit the ping signals when the capacitance of the variable resonator transmitting a beacon signal is changed.

12. The wireless power transmitter of claim 10, wherein the controller is configured to control the power transmitter to sequentially increase the capacitance of the variable capacitor for transmitting each respective ping signal of the ping signals with the different frequencies.

13. The wireless power transmitter of claim 9, wherein the controller is configured to sequentially transmit the ping signals to the wireless power receiver and change a capacitance of the variable resonator to an impedance predetermined as corresponding to a first ping signal of the ping signals upon a first signal in response to the first ping signal being received.

14. The wireless power transmitter of claim 9, wherein the controller is configured to identify a signal strength for each of plural response signals, including the response signal, through the variable resonator and in response to two or more of the ping signals and change a capacitance of the variable resonator so the power transmitter has an impedance corresponding to the ping signal corresponding to one of the response signals that has a strongest signal strength.

15. A wireless power transmitter, comprising:
   a power transmitter configured to wirelessly transmit power using a variable resonator; and
   a controller configured to control the power transmitter to transmit ping signals having different respective frequencies, and to control the variable resonator based on a response signal,
   wherein the controller is configured to
   control the power transmitter to wirelessly transmit power to the wireless power receiver according to the control of the variable resonator based on the response signal,
   sense the wireless power transmitter for indications of electrical characteristic changes, with respect to the wireless transmitting of power according to the control of the variable resonator based on the response signal, of the wireless power transmitter representing a sensed change of a control variable, and
   upon the sensing of the change of the control variable, control the power transmitter to wirelessly transmit power to the wireless power receiver with an adjusting of a capacitance of the variable resonator in accordance with the sensed change in the control variable.

16. A wireless power receiver, comprising:
   a resonator configured to receive wireless transmissions of different frequencies from a wireless power transmitter; and
   a modulator coupled to the resonator and configured to modulate a data feed responsive to a plurality of the wireless transmissions to encode at least one operational characteristic of the wireless power receiver to adaptively adjust a wireless transmission by the wireless power transmitter for reception of power according to one of the plurality of wireless transmissions,
   wherein the modulator modulates information for operational characteristics for each of the plurality of wireless transmissions and transmits respective response signals, with respective modulated information for each of the plurality of wireless transmissions, to the wireless power transmitter for adaptive adjustment of an impedance of the wireless power transmitter by the wireless power transmitter based on comparisons of the response signals as received by the wireless power transmitter.

17. The wireless power receiver of claim 16, further comprising:
   a controller coupled to the modulator, the controller configured to provide a data feed including the at least one operational characteristic of: state information, capacity information of a load, required voltage gain, or combinations thereof, to the modulator for transmission to a wireless power transmitter.

18. The wireless power receiver of claim 17, wherein the modulator comprises a network of capacitors coupled to at least one switch configured for selective switching of the capacitors responsive to the data feed.

19. The wireless power receiver of claim 18, further comprising:
   a position identification capacitor coupled to the resonator, the position identification capacitor configured to identify a position of a resonance circuit of the wireless power transmitter relative to the wireless power receiver.

20. The wireless power receiver of claim 17, wherein the modulator comprises a resistor coupled to a switch configured to selectively switch the resistor responsive to the data feed.

21. The wireless power receiver of claim 16, wherein the adjusting of the wireless transmission by the wireless power transmitter includes adjusting the impedance of a variable resonator of the wireless power transmitter according to which of the received response signals by the variable resonator has a strongest received signal strength.

* * * * *